US011138529B2

(12) United States Patent
Bentley et al.

(10) Patent No.: US 11,138,529 B2
(45) Date of Patent: Oct. 5, 2021

(54) TECHNIQUES FOR COORDINATING CODES FOR INFRASTRUCTURE MODELING

(71) Applicant: Bentley Systems, Incorporated, Exton, PA (US)

(72) Inventors: Keith A. Bentley, Elverson, PA (US); Paul Connelly, Exton, PA (US); Casey Mullen, Exton, PA (US); Shaun Sewall, Glenmoore, PA (US)

(73) Assignee: Bentley Systems, Incorporated, Exton, PA (US)

( * ) Notice: Subject to any disclaimer, the term of this patent is extended or adjusted under 35 U.S.C. 154(b) by 332 days.

(21) Appl. No.: 15/700,506

(22) Filed: Sep. 11, 2017

(65) Prior Publication Data

US 2019/0081847 A1    Mar. 14, 2019

(51) Int. Cl.
*G06F 9/44* (2018.01)
*G06Q 10/06* (2012.01)
(Continued)

(52) U.S. Cl.
CPC ............ *G06Q 10/06* (2013.01); *G06F 21/00* (2013.01); *G06Q 50/163* (2013.01); *H04L 29/06* (2013.01);
(Continued)

(58) Field of Classification Search
CPC .... G06F 3/1203; G06F 21/00; G06F 21/6245; H04L 9/3247; H04L 67/16; H04L 67/22;
(Continued)

(56) References Cited

U.S. PATENT DOCUMENTS 5,220,674 A * 6/1993 Morgan ................ G06F 3/1203
358/1.11
7,890,390 B2    2/2011 Cochran et al.
(Continued)

FOREIGN PATENT DOCUMENTS

WO    WO-2014/042687 A1    3/2014

OTHER PUBLICATIONS

"Notification of Transmittal of the International Search Report and the Written Opinion of the International Searching Authority, or the Declaration." International Filing Date: Jun. 21, 2018. International Application No. PCT/US2018/038748, Applicant: Bentley Systems, Incorporated, dated Feb. 19, 2019. pp. 1-22.
(Continued)

*Primary Examiner* — Tuan A Vu
(74) *Attorney, Agent, or Firm* — Cesari and McKenna, LLP; James A. Blanchette

(57) ABSTRACT

In various embodiments, techniques are provided for coordinating the assignment of codes to infrastructure elements in an infrastructure modeling software architecture. A chain of authority is provided from a code authority local to a client to a cloud-based code authority service. Further, a code is structured in three parts, including a code specification part identifying a code specification that indicates what information is encoded into the code and how it is encoded, a code scope part based on boundaries over which the code authority guarantees the code is unique, and a code value part with a unique value.

24 Claims, 5 Drawing Sheets

(51) Int. Cl.
*G06Q 50/16* (2012.01)
*G06F 21/00* (2013.01)
*H04L 29/06* (2006.01)
*H04L 9/32* (2006.01)
*H04W 4/70* (2018.01)
*G06F 21/62* (2013.01)
*G06F 3/12* (2006.01)
*H04L 29/08* (2006.01)

(52) U.S. Cl.
CPC ........ *G06F 3/1203* (2013.01); *G06F 21/6245* (2013.01); *H04L 9/3247* (2013.01); *H04L 67/16* (2013.01); *H04L 67/22* (2013.01); *H04W 4/70* (2018.02)

(58) Field of Classification Search
CPC ......... H04L 29/06; H04W 4/70; G06Q 10/06; G06Q 50/163
See application file for complete search history.

(56) References Cited

U.S. PATENT DOCUMENTS

| | | |
|---|---|---|
| 8,655,757 B1 | 2/2014 | Wookey et al. |
| 8,856,540 B1 | 10/2014 | Kirubanandan et al. |
| 8,972,962 B2 | 3/2015 | Becker et al. |
| 2007/0294711 A1* | 12/2007 | Modi ................ H04L 67/16 719/330 |
| 2014/0122897 A1* | 5/2014 | Dodeja ............... G06F 21/00 713/189 |
| 2014/0181274 A1 | 6/2014 | Bazin et al. |
| 2015/0222517 A1* | 8/2015 | McLaughlin ......... H04L 9/3247 713/156 |
| 2015/0269488 A1* | 9/2015 | Galai .................. H04L 67/22 706/11 |
| 2016/0277530 A1* | 9/2016 | Jung .................... H04W 4/70 |
| 2017/0123934 A1 | 5/2017 | Bentley |
| 2017/0171201 A1* | 6/2017 | Matsugashita ...... G06F 21/6245 |

OTHER PUBLICATIONS

"Invitation to Pay Additional Fees & Where Applicable Protest Fee." International Filing Date: Jun. 21, 2018. International Application No. PCT/US2018/038748, Applicant: Bentley Systems, Incorporated, dated Oct. 29, 2018, pp. 1-14.

U.S. Appl. No. 15/080,858, filed Mar. 25, 2016 by Keith A. Bentley et al. for Techniques for Conversion of CAD Descriptions, pp. 1-52.

* cited by examiner

TECHNIQUES FOR COORDINATING CODES FOR INFRASTRUCTURE MODELING

BACKGROUND

Technical Field

The present disclosure relates generally to computer-based modeling of infrastructure, and more specifically to techniques for coordinating the assignment of codes to infrastructure elements.

Background Information

Throughout the design, construction and operation of infrastructure (e.g., buildings, factories, roads, railways, bridges, etc.) it is often desirable to model the infrastructure using a collection of infrastructure elements that represents individual units, effectively creating a "digital twin" of some portion of the real world. Many real-world units of infrastructure have an identifier such as a manufacture's serial number, door number, asset or engineering tag, building number, etc. By associating a code that represents this real-world identifier with an infrastructure element of a model, the code may effectively create a "bridge" between the "digital world" and the "real-world."

However, in traditional computer-based modeling architectures there is generally no single "known place" or "known system" for generating and managing codes. Previous attempts have generally fallen into two categories: unmanaged or over-managed. In unmanaged approaches, codes are simply stored in connection with infrastructure elements as an assigned value. While this approach is simple to implement, it offers no assurance of the validity of any given code. As changes are made, codes may be inadvertently duplicated or changed by different software systems, and integrity may be lost. In over-managed approaches, multiple software entities are independently responsible for generating and managing codes. Each software entity may attempt to operate as a "source of truth" for codes. However, "multiple sources of truth" typically means that there are zero sources that can actually be relied upon as the ultimate arbiter.

What is needed are techniques for efficiently coordinating the assignment of codes to infrastructure elements.

SUMMARY

In various embodiments, techniques are provided for efficiently coordinating the assignment of codes to infrastructure elements in an infrastructure modeling software architecture. A chain of authority is provided from a code authority local to a client to a cloud-based code authority service. Further, a code is structured in three parts, including a code specification part that includes a reference to a code specification that defines what information is encoded into the code and how it is encoded, a code scope part based on boundaries over which the code authority guarantees the code is unique, and a code value part with unique values.

In one specific embodiment, a code authority executing on a computing device local to a client accesses a code authority service executing on one or more computing devices remote from the client to establish a chain of authority from the local code authority to the remote code authority service. The code authority provides to the code authority service a desired code scope. The code authority service generates one or more codes that are unique over the code scope and provides the one or more codes to the code authority local to the client. The code authority caches the codes in a code cache, and may eventually assign a code from the code cache to an infrastructure element. When assigned, the code is stored in one or more files accessible to the client and can be displayed to a user in a user interface of the client. Any unused codes are retuned from the code authority to the code authority service.

In another specific embodiment, a code is built by determining a code specification part indicating a reference to a code specification that defines what information is encoded into the code and how it is encoded, determining a code scope part based on boundaries over which the code authority guarantees the code is unique, determining a code value part with a unique value, and then concatenating the code specification part, code scope part, and code value part to create the code. A code authority assigns the code to an infrastructure element in one or more files accessible to a client, and the code can be displayed to a user in a user interface of the client.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which.

DETAILED DESCRIPTION

Definitions

As used herein the term "infrastructure" refers to a physical structure or object that has been built, or is planned to be built, in the real world. Examples of infrastructure include buildings, factories, roads, railways, bridges, etc.

As used herein, the term "code" refers to a record representing a real-world identifier of an individual unit of infrastructure. Examples of "codes" include records that represent manufacture's serial numbers, door numbers, asset or engineering tags, building numbers, etc.

As used herein, the term "built infrastructure schema" or "BIS" refers to a conceptual schema (i.e. a conceptual data model) that describes the semantics of data describing infrastructure. A BIS may be implemented using a number of underlying databases systems (e.g., a SQLite database system), with structures in the BIS mapped to a database schema (e.g., a DgnDb schema).

As used herein, the term "repository" refers to an electronic storage location for infrastructure data, such as a database. A repository may conform to a BIS.

As used herein, the term "briefcase" refers to a copy of at least a portion of a repository. A briefcase may be composed of one or more files (e.g., SQLite files) structured according to a database schema (e.g., a DgnDb schema). A briefcase is typically, though not necessarily, kept synchronized with a repository.

As used herein, the term "element" refers to a record maintained in a repository or briefcase that represents (i.e. serves as a proxy for) an entity in the real world, such as an individual unit of infrastructure. An element that represents infrastructure in the real world is referred to herein as an "infrastructure element."

As used herein, the term "enterprise" refers to a company or organization.

As used herein, the term "asset" refers to a collection of infrastructure (e.g., a facility, plant, building, campus, bridge, transportation system, etc.) that belongs to (e.g., is owned by, managed by, worked on by, etc.) an enterprise.

Example Embodiment

Figure 1:
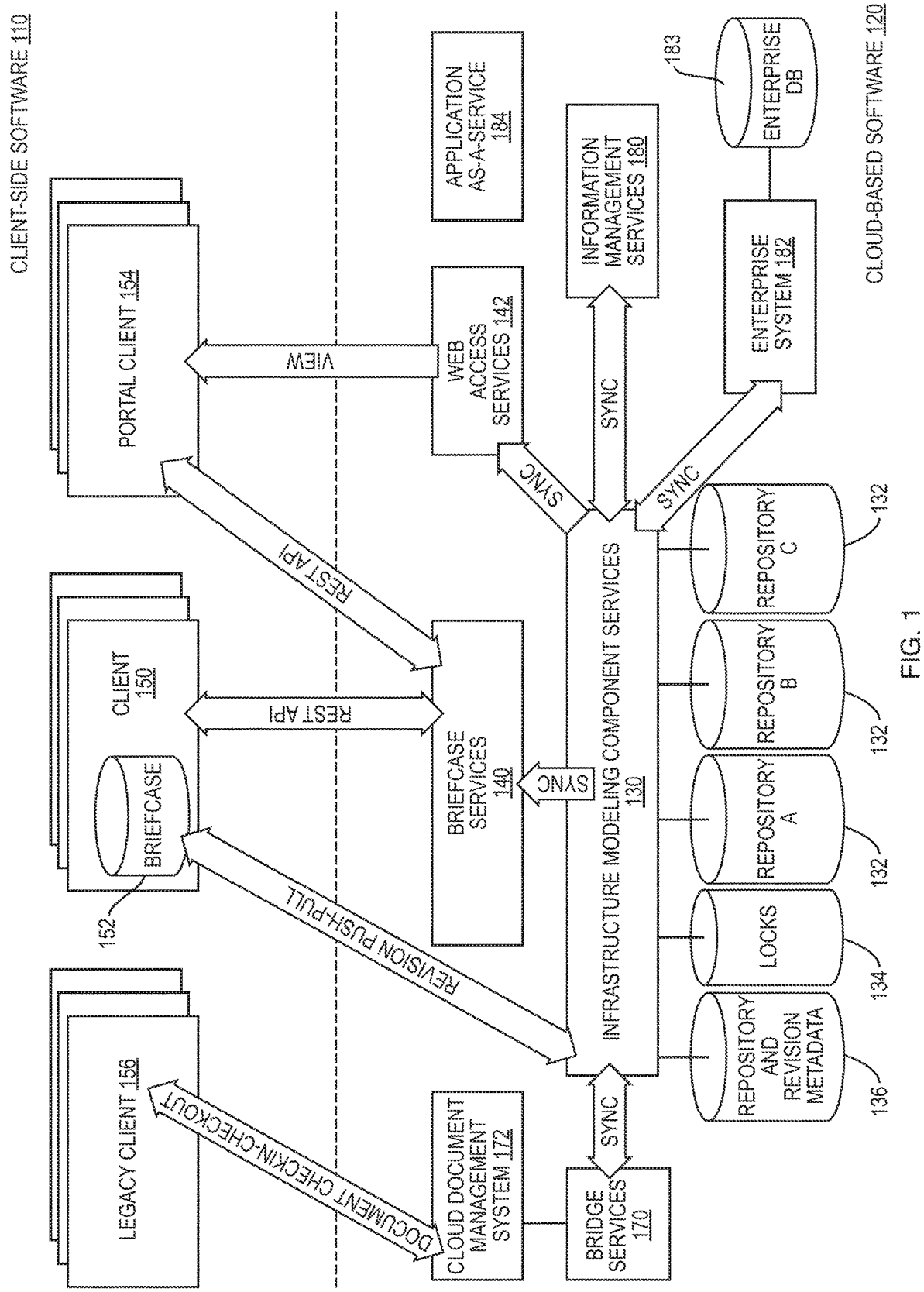
FIG. 1 is a high-level block diagram of at least a portion of an example infrastructure modeling software architecture.

FIG. 1 is a high-level block diagram of at least a portion of an example infrastructure modeling software architecture. The architecture may be divided into a client-side software 110 executing on one more or more computing devices arranged locally on-premises or hosted for an enterprise's use, and cloud-based services software 120 that is executed on one or more remote computing devices accessible to the enterprise, and other enterprises, over the Internet.

At the core of the cloud-based services software 120 are infrastructure modeling component services 130 (e.g., iModel™ hub services) that provide centralized management and synchronization support. The infrastructure modeling component services 130 manage repositories 132, 133, 134. The repositories 130 may take the form of databases (e.g., iModel™ databases) embodied as one or more files (e.g., DgnDb files). The files may be structured using a database system (e.g., a SQLite database system) according to a database schema (e.g., a DgnDb schema), with structures in a BIS mapped to structures in the database schema. Each repository 130, 133, 134 may be replicated in the cloud to have multiple copies that may be operated upon independently (e.g., with eventual consistency). Further, a number of repositories may be federated to share common services of the cloud-based services software 120. Repositories 132, 133, 134 may integrate information from many sources, and the infrastructure modeling component services 130 may maintain locks (e.g., according to a pessimistic locking approach) in a locks database 135. Further, the infrastructure modeling component services 130 may maintain a repository and revision metadata database 136 that stores creation and revision history information for the repositories 132, 133, 134.

To permit distributed, potentially disconnected, operation, the infrastructure modeling component services 130 operate together with briefcase services 140 (e.g., iModel™ briefcase services) to provide certain practitioner applications operating as clients 150 a copy of at least a portion of data from the repositories 132, 133, 134. Clients 150 may be executed locally on desktop or mobile computing devices of an enterprise or hosted for the enterprise's use. The portion of data from each repository 132, 133, 134 provided to a client 150 is structured as a briefcase (e.g., an iModel™ briefcase) 152 embodied as one or more files (e.g., SQLite files) according to a database schema (e.g., a DgnDb schema). Each briefcase 152 is typically kept synchronized with its corresponding repository 132, 133, 134 through revision push/pull operations. Further, each client 150 may utilized a Hypertext Transfer Protocol (HTTP)-based representational state transfer (REST) application program interface (API) to communicate with the briefcase services 140. The briefcase services 140 may provide clash detection, validation, costing, publishing, analytics, and other services for a briefcase 152.

Web access services 142 that are synchronized with the infrastructure modeling component services 130 may operate together with the briefcase services 140 to provide a view of repositories 132, 133, 134 to certain practitioner applications operating as portal clients 154. Portal clients 154 may be web based, executed locally on desktop or mobile computing devices or hosted. They receive live or published views from web access services 142. Further they communicate with the briefcase services 140 via a HTTP-based REST API. Such portal clients 154 generally do not maintain a local briefcase, but instead rely upon connectivity to the cloud-based services software 120.

Certain legacy practitioner applications may rely on older technologies and data formats. To support such legacy practitioner applications operating as legacy clients 154, the component services 130 may work together with bridge services (e.g., iModel™ bridge services) 170. A cloud document management system 172 may implement a document check in-check out system for a number of legacy file formats (e.g., DGN, DWG, RCT, IFC, etc.). The bridge services 170 incrementally convert data from a file in a legacy file format maintained by the cloud document management system 172 into data in a repository 132, 133, 134 when changes are made to the file by a legacy client 156.

The infrastructure modeling component services 130 may further interact with a number of cloud-based services that perform information management and support functions. Information services 180 manage asset data, project data, reality data, Internet of Things (IoT) data, codes, and other features. An enterprise system 182 manages an on-site or hosted enterprise database 183 storing enterprise-specific data. Further, an application-as-a-service platform 184 provides insights, deliverables management, package management, as well as a variety of other services.

Figure 2:
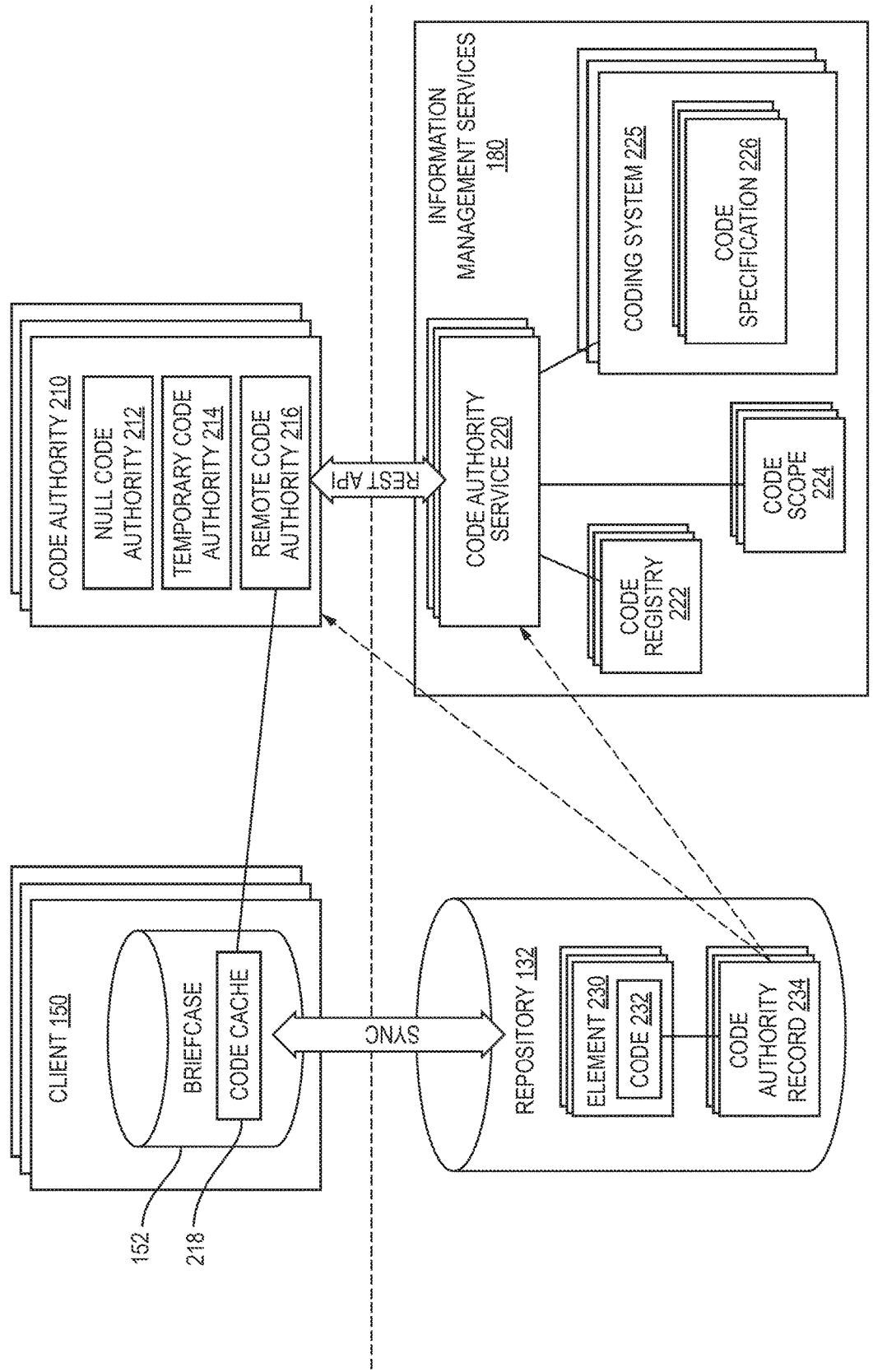
FIG. 2 is a more detailed block diagram focusing on the code generation and assignment aspects of the example infrastructure modeling software architecture of FIG. 1.

FIG. 2 is a more detailed block diagram focusing on the code generation and assignment aspects of the example infrastructure modeling software architecture of FIG. 1. Code authorities 210 may execute local to (i.e. on the same computing device as, or on the same local area network (LAN) as) a client 150 and a briefcase 152. The code authorities 210 are responsible for assigning codes upon request to infrastructure elements used by the client 150. In some special cases, codes may be generated locally by the code authority 210. In most cases, however, codes are generated by one or more code authority services 220 that are part of the information management services 180 that executes in the cloud, remote (i.e., accessible over the Internet) from the client 150 and the briefcase 152. Code authority services 220 serve as centralized authorities regarding codes, for example, unifying them across federated repositories.

Code authority services 220 may take the form of a number of instances of code authority service classes (e.g., corresponding to running instances of objects defined by object-oriented programming classes). Each instance of a code authority service 220 may be associated with a different URL, and may be specialized for generating codes for a different type of infrastructure element. An instance of a code authority service 220 manages one or more code registries 222.

A code registry 222 is a set of codes that are guaranteed unique amongst themselves and is the concrete manifestation of a code scope 224. A code scope 224 defines boundaries over which the codes are guaranteed unique (e.g., across an enterprise, asset, project, etc.). The boundaries of a code scope 224 may be based on a number of factors, and do not necessarily coincide with boundaries of repositories 132, 133, 134 whose infrastructure elements are being assigned the codes (e.g., a repository may be federated with other repositories for code purposes). A code scope may be identified by a universally unique identifier (UUID) and an additional text qualifier.

An instance of a code authority service 220 may further utilize (and persist information regarding) one or more coding systems 225 (e.g., a primary coding system and alternative coding systems) that each consist of a set of code specifications 226 that specify what information is encoded into the code and how it is encoded. A code specification 226 includes a set of rules (i.e. a scheme) used to generate and validate codes. The rules may include sequencing instructions describing how to determine individual values (e.g., numbers) that are already being used in codes, and how to determine a next value (e.g., number) in a sequence based on the existing values. Sequencing instructions may indicate whether to fill sequence "gaps", divisibly conventions (e.g., all values should be divisible by 10 or 100), and/or values to skip (e.g., skip unlucky values such as "13"), among other possibilities. Each code specification 226 may be identified by a URL.

Further, a code authority 210 may take the form of instances of a number of code authority classes (e.g., corresponding to running instances of objects defined by object-oriented programming classes). An instance of a code authority 210 is configured with the identifier (e.g., URL) of an instance of code authority service 220 with which it forms a pair, so that it may communicate with it, for example, over a HTTP-based REST API.

An instance of a null code authority 212 locally generates and assigns null codes to infrastructure elements that have no meaningful real-world identifier. An instance of a temporary code authority 214 locally generates and assigns temporarily-usable codes to infrastructure elements when there is no connectivity to an appropriate code authority service 220 and there are no available pre-allocated codes. Such codes may lack desired properties and may be replaced when connectivity is restored or pre-allocated codes otherwise become available. An instance of a remote caching code authority 216 assigns pre-allocated codes provided by an instance of a code authority service 220 and stored in a local code cache 218 of a briefcase 152, but does not generating any codes locally. Utilizing a predefined set of stateless operations via the HTTP-based REST API, an instance of a remote caching code authority 216 obtains codes generated at the corresponding instance of a code authority service 220, and stores them in the code cache 218 in connection with a code state (e.g., unused, reserved, used, or deprecated) which identifies whether the code is available to be assigned to an infrastructure element. On occasion, the remote caching code authority 216 may return codes (e.g., unused codes) back to the corresponding instance of a code authority service 220. In general, a client 150 will be able to at least periodically connect to the cloud-based services such that a remote caching code authorities 216 can obtain codes from code authority service 220. However, in some implementations, the client may never have such connectivity. To enable "never connected" distributed operation, a base set of codes may be pre-populated into the code cache 218 upon initial creation of the briefcase 152.

Each infrastructure element 230 in a repository 132, 133, 134, and thereby each copy of an infrastructure element 230 in a briefcase 152, includes a code 232 (e.g., in a code value string) and a code authority record 234 (which may be referenced by a portion of the code 232, as explained further below). The code authority record 234 identifies (e.g., via its URL) an instance of a code authority 210 used for assigning codes. In the case of a remote caching code authority 216, the code authority record 234 may further indicate an instance of a code authority service 220 (e.g., via its URL) as well as a code scope 234 (e.g., via its UUID) and code specification 226 to be used by the code authority service 220. In such manner, the infrastructure element has a relationship with a code scope 234 and a code specification 236.

Figure 3:
FIG. 3 is a diagram of an example three-part code that may be used in the infrastructure modeling software architecture of FIGS. 1 and 2.

A code 232 may be divided into a plurality of parts, for example three parts, that form a three-part-unique key for every infrastructure element in a repository 132, 133, 134 (i.e. no two elements have identical non-null values for all three parts). FIG. 3 is a diagram of an example three-part code that may be used in the software architecture of FIGS. 1 and 2. The three-part code includes a code specification part 310, a code scope part 320 and a code value part 330. The code specification part 310 may identify the code specification 226. The code scope part 320 may be a string, which indicates a layer of scoping in addition to code scope 224. The code value part 330 may be a string storing a unique value (i.e. a number) that may be based on sequencing instructions of the code specification 226.

The Internet domain namespace, currently administered by ICANN, may be leveraged. As mentioned above, each instance of a code authority 210 may be associated with a URL to identify the code authority that is responsible for the code. A globally unique name may be provided by structuring the URL in a host[/] path format (the usually scheme:[//] may be omitted), such as:

--- bentley.com/CodeAuthority/NullCodeAuthority or
bentley.com/CodeAuthority/RemoteCachedCodeAuthority.

---

In such format, the host may specify a domain name (e.g., bentley.com) in the Internet domain owned by the company (e.g., Bentley Systems, Inc.) that authored the code authority service class. The path may specify a record and class name (e.g., CodeAuthority/NullCodeAuthority, CodeAuthority/RemoteCachedCodeAuthority).

Likewise, as mentioned above, each instance of a code authority service 220 also may be associated with a URL, and this URL may be included in the code authority record 234 to identify the code authority service 220 that is responsible for the code, in the case of a remote caching code authority 216. A globally unique name may be provided by structuring the URL in a scheme:[//] host[?query] format, such as:

http://codes.bentley.com?scope={CodingScope}.

In such format, the host may specify a domain name (e.g., codes.bentley.com) owned by the company (e.g., Bentley Systems, Inc.) that authored the code authority service class, and the query may specify the code scope 224 (e.g., scope={CodingScope}).

Figure 4:
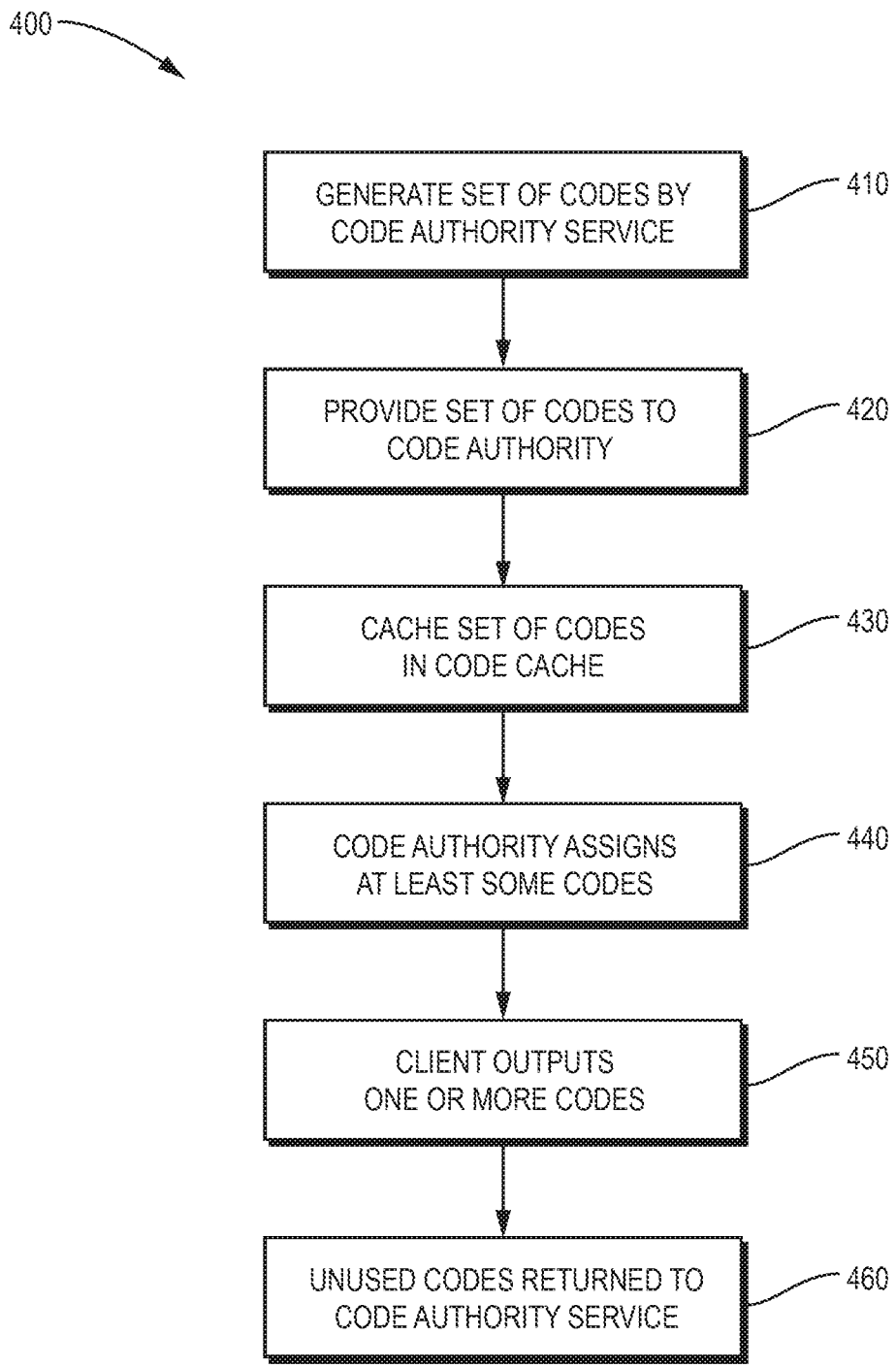
FIG. 4 is a flow diagram of an example simplified sequence of steps for assigning a code to an infrastructure element using the infrastructure modeling software architecture of FIGS. 1 and 2, specifically focusing on use of a remote caching code authority.

Operation of the above discussed infrastructure modeling software architecture may be illustrated by examples. FIG. 4 is a flow diagram of an example simplified sequence of steps 400 for assigning a code to an infrastructure element using the infrastructure modeling software architecture of FIGS. 1 and 2, specifically focusing on use of a remote caching code authority 216. At step 410, an instance of a code authority service 220 executing remote from a client 150 generates a set of codes that are unique over a code scope 224. As discussed above, the code scope 224 may be defined by a UUID. For example, in the case of an enterprise-wide scope, the UUID may indicate that the code is unique over the enterprise. Likewise, in the case of an asset-specific scope, the UUID may indicate that the code is unique over the asset. At step 420, the instance of the code authority service 220 provides a set of codes to an instance of a code authority 210, or specifically to a remote caching code authority 216, executing local to the client 150. At step 430, the instance of the remote caching code authority 216, caches the set of codes in its code cache 218, along with a code state of "unused." Subsequently, at step 440, the instance of the remote caching code authority 216, assigns at least some of the codes in the code cache 218 to infrastructure elements, updating their status to "used". At step 450, the client 150 outputs the codes of one or more of the infrastructure elements, for example, displaying them to a user upon demand, or providing them to another application. At step 460, codes in the code cache 218 whose status is still "unused" (e.g., after a given period of time or other event) are returned to the instance of the code authority service 220.

Figure 5:
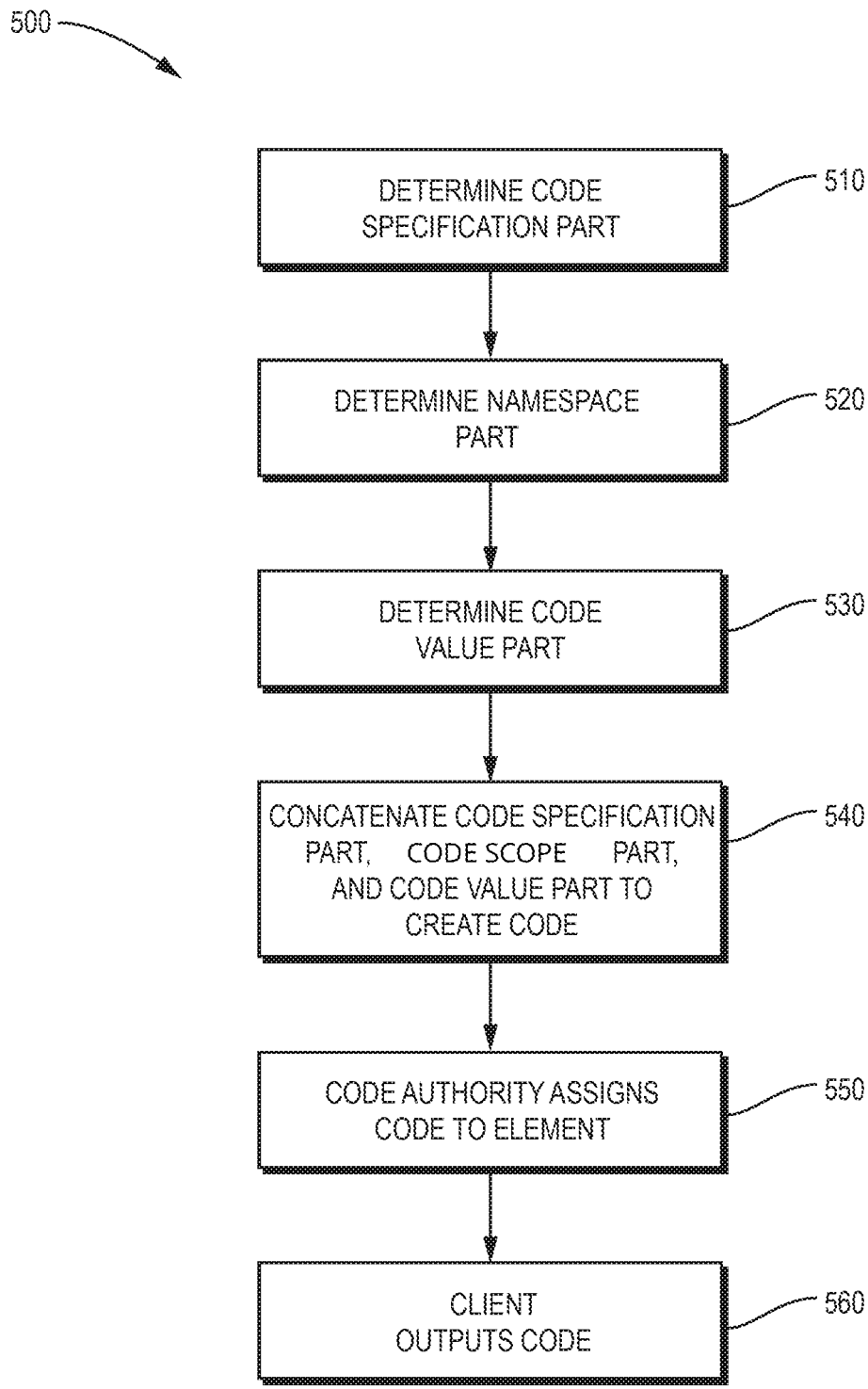
FIG. 5 is a flow diagram of an example simplified sequence of steps for assigning a code to an infrastructure element using the infrastructure modeling software architecture of FIGS. 1 and 2, specifically focusing on generation of a three-part code.

FIG. 5 is a flow diagram of an example simplified sequence of steps 500 for assigning a code to an infrastructure element using the infrastructure modeling software architecture of FIGS. 1 and 2, specifically focusing on generation of a three-part code. At step 510, an instance of a code authority service 220 determines a code specification part 310 of the code. The code authority part may be a reference to a code specification 226. At step 520, the code authority service 220 determines a code scope part 320 that indicates an additional layer of scoping over which the code authority guarantees the code is unique. At step 530, the code authority service 220 determines a code value part 330, which may be a sequence value based on sequencing instructions of a code specification 226. At step 540, an instance of the code authority service 220 concatenates the code specification part 310, code scope part 320, and code value part 330 to create a string that functions as the code 232. At step 550, an instance of a code authority 210, specifically a remote caching code authority 216, assigns the code 232 to an infrastructure element. At step 560, the client outputs the code, for example displaying it to a user upon demand or providing it to another application.

In conclusion, the above description details techniques for efficiently coordinating the assignment of codes to infrastructure elements in an infrastructure modeling software architecture. It should be understood that a wide variety of adaptations and modifications may be made to the techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for assigning codes to infrastructure elements that describe individual units of infrastructure in an infrastructure modeling software architecture, comprising:
    accessing, by a code authority executing on a computing device local to a client, a code authority service executing on one or more computing devices remote from the client, the accessing to establish a chain of authority from the code authority on the computing device local to the client to the code authority service on the remote computing device;
    providing, by the code authority to the code authority service, a desired code scope that defines a boundary over which codes are to be guaranteed unique, the boundary coinciding with at least one of an enterprise, asset or project;
    receiving, at the code authority from the code authority service, one or more codes that are unique over the code scope, wherein each code comprises a concatenation of a code specification part indicating what information is encoded into the code and how it is encoded, a code scope part based on the enterprise, asset or project over which the code is guaranteed unique, and a code value part with a unique value;
    assigning, by the code authority, a code from the one or more codes to an infrastructure element;
    storing the code in one or more files accessible to the client; and
    upon request, displaying the assigned code of the infrastructure element to a user in a user interface of the client.

2. The method of claim 1, wherein the one or more codes are a plurality of codes, and the method further comprises:
    caching the one or more codes in a code cache of the code authority; and
    returning one or more unused codes from the codes authority to the code authority service.

3. The method of claim 1, further comprising:
    identifying the code authority with a code authority record in the one or more files, the code authority record including a URL that has a host portion that includes a domain name in the Internet domain of a company that authored the code authority and a path portion that includes a class name for the code authority.

4. The method of claim 1, further comprising:
    identifying the code authority service with a code authority record in the one or more files, the code authority record including a URL that includes a host portion that includes a domain name in the Internet domain of a company that authored the code authority service and a query portion that indicates the code scope.

5. The method of claim 1, wherein the code scope is an enterprise-wide scope that defines that the code is unique over the enterprise.

6. The method of claim 1, wherein the code scope is an asset-specific scope, that defines that the code is unique over an asset of an enterprise.

7. The method of claim 1, wherein the one or more files maintain a synchronized copy of at least a portion of data from a repository maintained on the one or more computing devices remote from the client.

8. The method of claim 1, wherein the code authority is identified by a URL that includes a domain name of a company that authored the code authority in the Internet domain of the company and a class name for the code authority.

9. The method of claim 1, wherein the code scope part comprises a string indicating a layer of scoping, and the code value part comprises a string based on sequencing instructions of a code specification.

10. A method for assigning codes to infrastructure elements that describe individual units of infrastructure in an infrastructure modeling software architecture, comprising:
   determining a code specification part based on a code specification, the code specification part indicating what information is encoded into codes and how it is encoded;
   determining a code scope part based on an enterprise, asset or project over which a code authority executing on a computing device guarantees the code is unique;
   determining a code value part with a unique value;
   concatenating the code specification part indicating what information is encoded into the code and how it is encoded, the code scope part based on the enterprise, asset or project over which the code is guaranteed unique, and the code value part with the unique value to create a code;
   assigning, by the code authority executing on the computing device, the code to an infrastructure element in one or more files accessible to a client; and
   displaying the assigned code of the infrastructure element to a user in a user interface of the client.

11. The method of claim 10, wherein the code authority is identified with a uniform resource locator (URL) that has a host portion that includes a domain name in the Internet domain of a company that authored the code authority and a path portion that includes a class name for the code authority.

12. The method of claim 10, wherein the code authority is a remote caching code authority and a code authority service executes on one or more computing devices remote from the computing device that is responsible for the code.

13. The method of claim 12, wherein the code authority service is identified with a uniform resource locator (URL) that has a host portion that includes a domain name in the Internet domain of a company that authored the code authority service and a query portion that indicates a code scope utilized by the code authority service.

14. The method of claim 13, wherein the code scope is an enterprise-wide scope of an enterprise over which the code is unique.

15. The method of claim 13, wherein the code scope is an asset-specific scope of an asset of an enterprise over which the code is unique.

16. The method of claim 10, wherein the code scope part comprises a string indicating a layer of scoping.

17. The method of claim 10, wherein the code value part comprises a string based on sequencing instructions of the code specification.

18. The method of claim 10, wherein the computing device executing the code authority is local to the client, and the determining the code specification part, determining the code scope part, determining the code value part, and the concatenating are performed by a code authority service executing on one or more computing devices remote from the client.

19. An infrastructure modeling software architecture for assigning codes to infrastructure: elements that describe individual units of infrastructure, comprising:
   a client that maintains one or more files that include infrastructure elements to which codes are assigned, the client having a user interface that displays the code of an infrastructure element to a user;
   a code authority executing on a computing device local to the client, the code authority including a code cache of codes assignable to infrastructure elements;
   a code authority service executing on one or more computing devices remote from the client, the code authority service providing a chain of authority to the code authority on the computing device local to the client, the code authority service configured to:
      receive a desired code scope from the code authority that defines a boundary over which codes are to be guaranteed unique, the boundary coinciding with at least one of an enterprise, asset or project,
      generate the one or more codes to be unique over the code scope, wherein each code comprises a concatenation of a code specification part indicating what information is encoded into the code and how it is encoded, a code scope part based on the enterprise, asset or project over which the code is guaranteed unique, and a code value part with a unique value,
      provide to e cod authority or more codes that are unique over the code scope; and
   wherein the code authority is configured to:
      assign a code from the one or more codes to an infrastructure element,
      store the code in one or more files accessible to the client, and
      upon request, display the assigned code of the infrastructure element to a user in a user interface of the client.

20. The infrastructure modeling software architecture of claim 19, wherein the one or more codes are a plurality of codes and the code authority is further configured to:
   cache the one or more codes in a code cache; and
   return one or more unused codes from the code cache to the code authority service.

21. The infrastructure modeling software architecture of claim 19, wherein the one or more files include a code authority record that identifies the code authority with a URL that includes a domain name in the Internet domain of a company that authored the code authority and a class name for the code authority.

22. The infrastructure modeling software architecture of claim 19, wherein the one or more files include a code authority record that identifies the code authority service with a URL that includes a host portion that includes a domain name in the Internet domain of a company that authored the code authority service and a query portion that indicates the code scope utilized by the code authority service.

23. The infrastructure modeling software architecture of claim 19, wherein the one or more files maintain a synchronized copy of at least a portion of data from a repository maintained on the one or more computing devices remote from the client and the infrastructure elements in the one or more files are a copy of infrastructure elements in the repository.

24. An infrastructure modeling software architecture for assigning codes to infrastructure elements that describe individual units of infrastructure, comprising:

a client that maintains one or more files that include infrastructure elements to which codes are assigned, the client having a user interface that displays the code of an infrastructure element to a user;

a code authority executing on a computing device local to the client, the code authority including a code cache of codes assignable to infrastructure elements; and a code authority service executing on one or more computing devices remote from the client, the code authority service configured to:

determine a code specification part indicating what information is encoded into the code and how it is encoded, determine a code scope part based on an enterprise, asset or project over which the code authority guarantees the code is unique, determine a code value part with a unique value, concatenate the code specification part indicating what information is encoded into the code and how it is encoded, the code scope part based on the enterprise, asset or project over which the code is guaranteed unique, and the code value part with the unique value to create a code, and provide the code to the code authority for assignment to an infrastructure element in the one or more files.

\* \* \* \* \*